(12) United States Patent
Ogasawara et al.

(10) Patent No.: US 6,783,435 B1
(45) Date of Patent: Aug. 31, 2004

(54) METHOD OF MANUFACTURING MAGNETIC HEAD, AND MAGNETIC RECORDING AND REPRODUCING APPARATUS

(75) Inventors: Shinya Ogasawara, Moriguchi (JP); Mitsuhisa Fujiki, Ikoma (JP); Satoshi Yamabayashi, Hirakata (JP); Tetsuya Okana, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 128 days.

(21) Appl. No.: 10/130,776

(22) PCT Filed: Nov. 22, 2000

(86) PCT No.: PCT/JP00/08225

§ 371 (c)(1), (2), (4) Date: May 21, 2002

(87) PCT Pub. No.: WO01/39181

PCT Pub. Date: May 31, 2001

(30) Foreign Application Priority Data

Nov. 24, 1999 (JP) ............................................. 11-332291

(51) Int. Cl.$^7$ ................................................. B24B 1/00
(52) U.S. Cl. .............................................. 451/41; 451/8
(58) Field of Search ....................... 451/41, 8; 360/110, 360/122, 21; 29/603.11, 835

(56) References Cited

U.S. PATENT DOCUMENTS 4,890,378 A * 1/1990 Suzuki et al. ............. 29/603.13
5,130,875 A     7/1992 Ono et al.
5,718,036 A * 2/1998 Oji et al. .................. 29/603.12
5,867,887 A * 2/1999 Kumagai et al. ......... 29/603.08
5,978,185 A    11/1999 Abe et al.
6,233,812 B1    5/2001 Fujiki et al.

FOREIGN PATENT DOCUMENTS

| JP | 55-135327  | 10/1980 |
|----|------------|---------|
| JP | 61-194607  | 8/1986  |
| JP | 3-49004    | 3/1991  |
| JP | 4-42412    | 2/1992  |
| JP | 6-301916   | 10/1994 |
| JP | 7-176013   | 7/1995  |
| JP | 9-212810   | 8/1997  |
| JP | 9-231512   | 9/1997  |
| JP | 10-247309  | 9/1998  |

* cited by examiner

Primary Examiner—Dung Van Nguyen
(74) Attorney, Agent, or Firm—Merchant & Gould P.C.

(57) ABSTRACT

A magnetic head is manufactured by grinding a head chip (2) with a gap depth (GD 1) to remove its margin (6) until the gap depth becomes a final gap depth (GD 2). The gap depth (GD 1) is 25 microns or thinner. The method increases yield and productivity in the manufacture of a high performance magnetic head with a decreased gap depth (GD 2), which satisfies the standards of both the gap depth (GD 2) and the distance between the head gap and the outermost point of the chip front.

9 Claims, 1 Drawing Sheet

METHOD OF MANUFACTURING MAGNETIC HEAD, AND MAGNETIC RECORDING AND REPRODUCING APPARATUS

TECHNICAL FIELD

The present invention relates to a method for manufacturing a magnetic head to be mounted on a VTR, etc., and a magnetic recording and reproducing apparatus.

BACKGROUND ART

FIG. 1 is a front view showing an example of a conventional magnetic head. The magnetic head shown in this figure includes a head base 1 and right and left chips 2 and 3 (which will be referred to as "chip(s)" hereinafter) that are adhered to the head base 1 via adhesives 4a and 4b. The chip 2 is formed by adhering metal plates (cores) 2a and the chip 3 is formed by adhering plates 3a, respectively. Around each of the metal plates 2a and 3a, a coil 5 is wound.

A gap 2b is a space at the adhering portion between the metal plates 2a of the chip 2, and a gap 3b is a space at the adhering portion between the metal plates 3a of the chip 3, respectively. Such a magnetic head is installed on a rotating cylinder (not shown in drawing) and slides on the magnetic tape.

FIG. 2 is an enlarged view showing the chip 2 of FIG. 1. GD 1 and GD 2 indicate the dimensions of the gap depth (depth of the gap), respectively. GD 1 indicates the dimension of the gap depth before grinding and GD 2 indicates the dimension of the gap depth after grinding. Furthermore, reference numeral 6 denotes a portion removed by grinding and the difference between GD 1 and GD 2 (GD 1–GD 2) is a grinding amount.

Such a grinding is carried out by installing the magnetic head on a rotation drum for grinding, and bringing a grinding tape 9 (see FIG. 1) into contact with the left and right chip fronts rotating integrally with a rotation drum.

FIG. 3 is a perspective view of the chip 2 seen from the upper side. Bo in this figure indicates the distance between the head gap 2c that is a gap at the front portion of the chip 2 and a top 7 of a curved surface of the chip front. A plurality of annular lines 8 indicate contour lines, where the lines closer to the inside means higher and the position at the top 7 means the highest. Since the contact condition of the magnetic tape becomes excellent at the top 7 portion, it is preferable that the top 7 is located as dose as possible to the head gap 2c. It is ideal that the top 7 is located on the head gap 2c, that is, Bo=0 is satisfied.

The measurement of the above-mentioned contour lines is carried out by measuring the top of the curved surface when the head gap 2c is seen from an extended part of the line extending between the head gap 2c and the rotation center of the rotation cylinder, with the use of an interference-pattern measuring device. For instance, when the diameter of the rotation cylinder is 21.7 mm, the measurement is carried out with the chip inclined by 3 degrees 10 minutes.

GD 2 and Bo are important factors affecting the performance of a magnetic head, and in the manufacturing process, it is necessary to screen a magnetic head having GD 2 and Bo ranging within the predetermined standard value satisfying the necessary performance. For instance, when the standard value of GD 2 is in the range from 10 to 15 $\mu$m, a magnetic head with GD 1 of about 30 $\mu$m was prepared and a magnetic head with GD 2 of the both chips after grinding in the range from 10 to 15 $\mu$m and Bo in the range from –50 to 50 $\mu$m was screened to be used.

Herein, in order to improve the transmission rate of the magnetic head, it is necessary not only to increase the number of magnetic heads to be mounted on one rotation cylinder but also to improve the head performance such as C/N (ratio of carrier wave output to noise) with respect to an individual magnetic head. It is known that when GD 2 is decreased, C/N is improved. Consequently, for improving the head performance, CD2 is preferably decreased.

However, in the above-mentioned conventional method for manufacturing a magnetic head having GD 1 of about 30 $\mu$m, there was a problem in that variation in the difference between the both chips after grinding is large and the rate of GD 2 and Bo of the both chips being in the specified value is low, and thus the yield becomes low. It is thought that the same is true in the case of manufacturing the high performance magnetic head in which GD 2 is reduced as mentioned above. Therefore, in order to manufacture the high performance magnetic head efficiently, it was necessary to solve the problem with respect to the yield.

Disclosure of the Invention

With the foregoing in mind, it is an object of the present invention is to provide a method for manufacturing a magnetic head with a high yield by setting the dimension of a gap depth of a head chip before grinding to be 25 $\mu$m or less so as to reduce the defect in the dimension of the gap depth and the distance between the head gap and the top of the curved surface of the chip front, and to provide a magnetic recording and reproducing apparatus manufactured by this method.

In order to achieve the above-mentioned object, a method for manufacturing a magnetic head according to the present invention includes grinding a front of a head chip so as to form a front shape of the head chip, wherein the dimension of a gap depth of the head chip before grinding is 25 $\mu$m or less. According to the above-mentioned method for manufacturing a magnetic head, it is possible to improve the yield of the magnetic head satisfying the standard values of both the dimension of the gap depth and the distance between the head gap and the top of the curved surface of the chip front. Therefore, it is possible to improve the productivity in manufacture of a high-performance magnetic head with a decreased gap depth.

In the above-mentioned method for manufacturing the magnetic head, it is preferable that the dimension of the gap depth before grinding is 20 $\mu$m or less. Furthermore, in the method for manufacturing a magnetic head having the dimension of the gap depth before grinding of 20 $\mu$m or less, it is preferable that the dimension of the gap depth after grinding is to be 1 $\mu$m or more.

Furthermore, it is preferable that the dimension of the gap depth before grinding is 15 $\mu$m or less. Furthermore, in the method for manufacturing the magnetic head having the gap depth before grinding of 15 $\mu$m or less, it is preferable that the dimension of the gap depth after grinding is to be 1 $\mu$m or more.

Furthermore, it is preferable that the difference between the dimension of the gap depth before grinding and the dimension of the gap depth after grinding is 19 $\mu$m or less. According to the above-mentioned method for manufacturing a magnetic head, since the maximum value of the dimension of the gap depth before grinding is 25 $\mu$m, by setting the grinding amount to be 19 $\mu$m or less, it is possible to manufacture a magnetic head in which the magnetic head performance is improved while setting the standard value of the dimension of the gap depth to be 6 to 9 $\mu$m. In this case, as compared with the conventional case of grinding the chip in which a dimension of the gap depth before grinding is about 30 $\mu$m, the grinding amount becomes smaller. Thus, it is possible to improve the yield of the magnetic head satisfying the standard values of the dimension of the gap depth and the distance between the head gap and the chip front.

Furthermore, it is preferable that the difference between the dimension of the gap depth before grinding and the dimension of the gap depth after grinding is 14 μm or less. According to the above-mentioned method for manufacturing the magnetic head, for example, when the dimension of the gap depth before grinding is set to 20 μm or less, it is possible to manufacture a magnetic head in which the magnetic head performance is improved while setting the standard value of the dimension of the gap depth to 6 to 9 μm. Also in this case, as compared with the conventional case, the grinding amount becomes smaller, and it is possible to improve the yield of the high-performance magnetic head.

Furthermore, it is preferable that the difference between the dimension of the gap depth before grinding and the dimension of the gap depth after grinding is 9 μm or less. According to the above-mentioned method for manufacturing a magnetic head, for example, when the dimension of the gap depth before grinding is set to 15 μm or less, it is possible to manufacture a magnetic head in which the magnetic head performance is improved while setting the standard value of the dimension of the gap depth to 6 to 9 μm. Also in this case, as compared with the conventional case, the grinding amount becomes smaller, and it is possible to improve the yield of manufacturing the high-performance magnetic head.

Furthermore, it is preferable that a plurality of head chips are mounted on one magnetic head and the grinding is carried out with respect to the plurality of head chips simultaneously. According to the above-mentioned method for manufacturing a magnetic head, it is possible to reduce the difference in the dimension of the gap depth between a plurality of head chips, and variation in the difference of the distance between the head gap and the top of the curved surface of the chip front, thus improving the yield of a high performance magnetic head.

Next, a magnetic recording and reproducing apparatus of the present invention includes a magnetic head manufactured by the above-mentioned method for manufacturing a magnetic head to be mounted. According to the above-mentioned magnetic recording and reproducing apparatus, since the magnetic head manufactured by the manufacturing method of the present invention is used, the magnetic recording and reproducing apparatus can be manufactured with high productivity and at low cost.

BEST MODE FOR CARRYING OUT THE INVENTION

Figure 2:
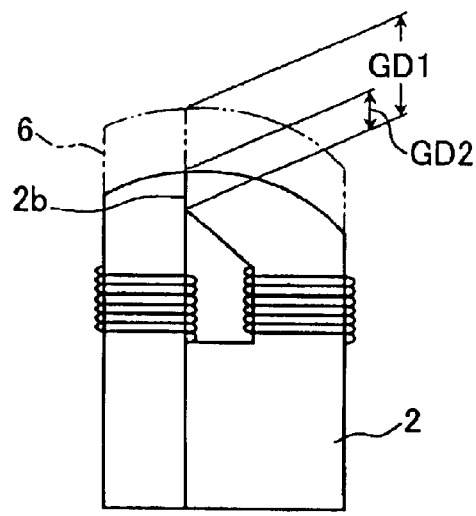
FIG. 2 is an enlarged view showing a chip 2 shown in FIG. 1.
Figure 3:
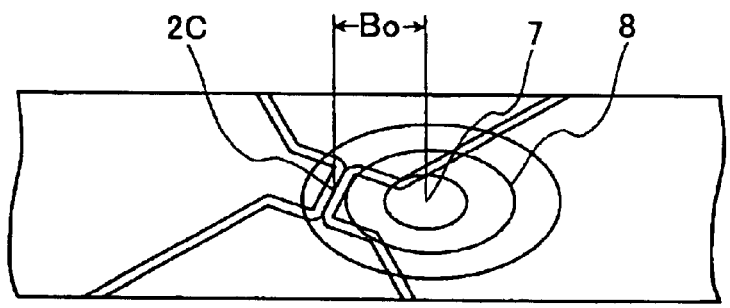
FIG. 3 is a perspective view showing the chip 2 shown in FIG. 1 seen from the upper side.

Hereinafter, the present invention will be explained by way of an embodiment with reference to drawings. Since the basic configuration of a magnetic head of this embodiment is the same as the configuration shown in FIGS. 1 to 3 used for the explanation of the prior art, this embodiment will also be explained with reference to FIGS. 1 to 3 and the explanation for the same portions is omitted herein.

In order to obtain a magnetic head having a predetermined performance, it is necessary that GD 2 of both chips are within the range of the standard value and also Bo is within the range of the standard value. Furthermore, as mentioned above, it is known that when GD 2, which denotes a dimension of the gap depth after grinding, is reduced, C/N is improved. In order to obtain a magnetic head having a higher transmission rate, GD 2 is required to be reduced.

Figure 1:
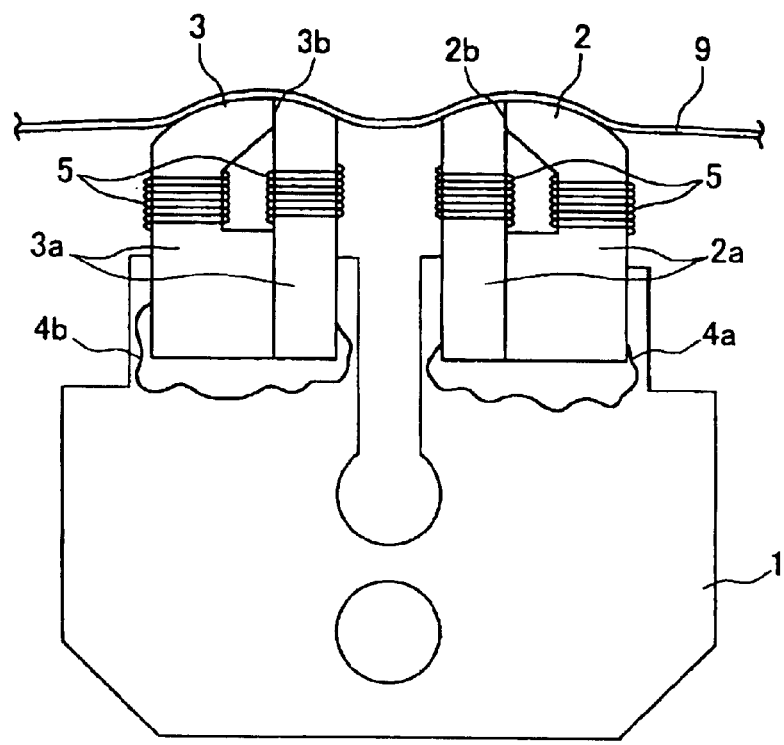
FIG. 1 is a front view showing one example of a magnetic head.

This embodiment relates to a manufacturing method capable of efficiently obtaining a high-performance magnetic head even in the case where the standard value of GD 2 is set to be small. Hereinafter, the method will be explained by the use of results of experiments. In each experiment, the grinding step itself is carried out in the same manner as in the prior art. That is, the grinding step was carried out with the use of the magnetic head formed by attaching the right and left chips 2 and 3 to the head base 1 as shown in FIG. 1 by installing the magnetic head to a rotation drum for grinding, and bringing a grinding tape 9 into contact with a chip front rotating integrally with the rotation drum.

Hitherto, when the standard value of GD 2 was set in the range from 10 to 15 μm, GD 1 was set to about 30 μm. In each experiment mentioned below, in order to obtain a magnetic head with the improved transmission rate, the standard value of GD 2 was set in the range from 6 to 9 μm and the standard value of Bo was set in the range from −50 to 50 μm. The upper limit of the standard value of GD 2 is set from the viewpoint of securing C/N and the lower limit of the standard value of GD 2 is set from the viewpoint of securing the lifetime of the head. When GD 2 is within the standard value, it is possible to secure the head lifetime of the head while securing the C/N.

Under the setting of such a standard value, first, similar to the case of the prior art, GD 1 was set in the range: 25<GD 1≦35 μm and then the grinding work was carried out. The number of samples was 20. The group of these samples (Nos. 1 to 20 in Table 1) will be referred to as group I hereinafter. The following Table 1 shows the measurement results of the group I.

TABLE 1

| No. | GD R GD 1 | GD R GD 2 | GD L GD 1 | GD L GD 2 | E (GD) | Bo R | Bo L | E (Bo) | E (Total) |
|---|---|---|---|---|---|---|---|---|---|
| 1 | 29 | 5.6 | 26 | 9.6 | B | −32.1 | 36.8 | A | B |
| 2 | 26 | 4 | 27 | 9.2 | B | −42 | 0.3 | A | B |
| 3 | 34 | 8.6 | 33 | 8.2 | A | −46.8 | 0.5 | A | A |
| 4 | 32 | 6 | 31 | 9.4 | A | −69.8 | 0.5 | B | B |
| 5 | 29 | 4.8 | 33 | 9 | B | −64 | 21.2 | B | B |
| 6 | 34 | 5 | 34 | 9.6 | B | −48.9 | 57.7 | B | B |
| 7 | 29 | 5.4 | 28 | 7.6 | B | −78 | 34.1 | B | B |
| 8 | 27 | 7.2 | 26 | 8.6 | A | −42.8 | 44.3 | A | A |
| 9 | 33 | 8.4 | 26 | 8.8 | A | −42.7 | 59.8 | B | B |
| 10 | 28 | 8.8 | 29 | 3.7 | B | −36.6 | 71.2 | B | B |
| 11 | 33 | 9.6 | 35 | 5.6 | B | −25.3 | 60.8 | B | B |
| 12 | 31 | 8.6 | 35 | 7.2 | A | −4.1 | 73.3 | B | B |
| 13 | 27 | 7.6 | 31 | 6.8 | A | −50.2 | 28.7 | B | B |
| 14 | 31 | 8.6 | 27 | 7.4 | A | −29.2 | 30.7 | A | A |
| 15 | 28 | 8.6 | 33 | 5.6 | B | −47.9 | 41.9 | A | B |
| 16 | 26 | 8.4 | 27 | 7.2 | A | −34.7 | 36.8 | A | A |
| 17 | 26 | 8.6 | 28 | 8.2 | A | −23.1 | 59.4 | B | B |
| 18 | 29 | 8.4 | 31 | 7.4 | A | −6.5 | 48.5 | A | A |
| 19 | 33 | 8 | 32 | 6.8 | A | −26.3 | 60.4 | B | B |
| 20 | 35 | 8.4 | 34 | 5.6 | B | −45.3 | 44.6 | A | B |

(In the above Table 1, E means evaluation, R means right and L means left. These marks are applied to Tables 2 and 3.)

In Table 1, E (GD), i.e. evaluation (GD) means an evaluation with respect to GD 2. When GD 2 of both right and left chips were within the standard value: 6 to 9 μm, the evaluation "A" was given. When at least one of GD 2 was out of the range of the standard value, the evaluation "B" was given. The E (Bo), i.e. evaluation (Bo) means an evaluation with respect to Bo. When Bo of both right and left chips were in the standard value: −50 to 50 μm, the evaluation "A" was given. When at least one of Bo was out of the range of the standard value, the evaluation "B" was given. The E (Total), i.e. evaluation (total) was "A", when both the evaluation (GD) and the evaluation (Bo) were "A"; and the total evaluations was "B," when at least one of the evaluation was "B." These explanations for Table 1 are applied also to the explanations for Tables 2 and 3 mentioned below.

As is apparent from the results shown in Table 1, the number of the samples with the evaluation (total) "A" was 5 and the yield was (5/20)×100=25%.

Next, the grinding work was carried out with GD 1 set in the range of 20≦GD 1≦25 µm. The number of samples was 20. The group of these samples (Nos. 21 to 40) will be referred to as group II, hereinafter. The following Table 2 shows the measurement results of the group II.

TABLE 2

| | GD | | | | E | Bo | | E | E |
|---|---|---|---|---|---|---|---|---|---|
| | R | | L | | | | | | |
| No. | GD 1 | GD 2 | GD 1 | GD 2 | (GD) | R | L | (Bo) | (Total) |
| 21 | 20 | 7.0 | 21 | 8.2 | A | −50.1 | 27.7 | B | B |
| 22 | 23 | 8.8 | 24 | 6 | A | −7.4 | 50.8 | B | B |
| 23 | 21 | 8.9 | 20 | 8.2 | A | 12.6 | 46.8 | A | A |
| 24 | 22 | 8.4 | 20 | 7.2 | A | 11.4 | 33.3 | A | A |
| 25 | 20 | 8.0 | 24 | 8.9 | A | −7.5 | 39.1 | A | A |
| 26 | 25 | 8.8 | 24 | 8.2 | A | −4.6 | 21.5 | A | A |
| 27 | 25 | 8.6 | 24 | 5.4 | B | −19.9 | 23 | A | B |
| 28 | 23 | 8.8 | 22 | 8.4 | A | −7.1 | 10.3 | A | A |
| 29 | 22 | 8.4 | 21 | 8.2 | A | 4.9 | 21.5 | A | A |
| 30 | 21 | 7.8 | 25 | 7.2 | A | −24.8 | 14.5 | A | A |
| 31 | 21 | 5.8 | 25 | 8.8 | B | 21.4 | 45.7 | A | B |
| 32 | 23 | 8.3 | 24 | 8.7 | A | −148 | −61.1 | B | B |
| 33 | 24 | 8.9 | 25 | 8.7 | A | 0 | 16.3 | A | A |
| 34 | 23 | 3.9 | 23 | 9.1 | B | −22.5 | 12.8 | A | B |
| 35 | 21 | 8.7 | 23 | 6.5 | A | 0 | 26.1 | A | A |
| 36 | 22 | 3.5 | 25 | 9.5 | B | −50 | 41.8 | A | B |
| 37 | 24 | 8.1 | 22 | 7.1 | A | −39.1 | 0 | A | A |
| 38 | 22 | 8.4 | 22 | 6.0 | A | −46.8 | 23 | A | A |
| 39 | 23 | 8.2 | 21 | 8.8 | A | −4.4 | 27.1 | A | A |
| 40 | 24 | 8.4 | 25 | 7.2 | A | −7.6 | 25.5 | A | A |

As is apparent from the results shown in Table 2, the number of the samples with the evaluation (total) "A" was 13 and the yield was (13/20)×100=65%, which is improved significantly as compared with the group I.

Next, when the results of Table 1 and the results of Table 2 were compared, the number of the samples with the evaluation "A" with respect to the evaluation (GD) was increased from 11 in group I to 16 in group II. The number of the samples with the evaluation "A" with respect to the evaluation (Bo) was increased from 10 in group I to 19 in group II.

Herein, when the grinding proceeded further, if the difference in the gap depth between right and left chips is within the range of 3 µm or less, that is the difference between the upper limit and the lower limit of the standard value: 6 to 9 µm, GD 2 of both chips can be set theoretically in the range of the standard value. On the contrary, the difference of GD 2 between the right and left chips becomes more than 3 µm, GD 2 of only one chip can be set in the range of the standard value, but GD 2 of another chip cannot be set within the standard value.

This is because, the grinding of both left and right chips is carried out simultaneously by using a common grinding tape, so that the grinding amount per chip cannot be adjusted by stopping the grinding of one of the chips or delaying the grinding speed of one of the chips.

In other words, the fact that the number of "A" in the evaluation (GD) was increased in group II means that when the group II is compared with the group I, the number where the difference in GD 2 between the right and left chips is in the range of 3 µm or less is large. This shows that if the GD 1 is set to be small in advance, variation in GD 2 between the right and left chips can be reduced, and thus GD 2 of both right and left chips easily can fall in the standard value.

Next, GD 1 was set to a smaller value, the grinding work was carried out in the range of 15≦GD 1<20 µm and then the measurement was carried out. The number of samples was 20. The group of these samples (Nos. 41 to 60) will be referred to as group III, hereinafter. The following Table 3 shows the measurement results of the group III.

TABLE 3

| | GD | | | | E | Bo | | E | E |
|---|---|---|---|---|---|---|---|---|---|
| | R | | L | | | | | | |
| No. | GD 1 | GD 2 | GD 1 | GD 2 | (GD) | R | L | (Bo) | (Total) |
| 41 | 16 | 8.1 | 17 | 6.8 | A | −15.8 | −22.5 | A | A |
| 42 | 15 | 8.6 | 16 | 8.0 | A | 25 | 30 | A | A |
| 43 | 18 | 7.6 | 19 | 6.5 | A | −16.8 | −1.8 | A | A |
| 44 | 19 | 9.2 | 15 | 4.8 | B | 10 | 9.9 | A | B |
| 45 | 17 | 7.6 | 15 | 8.9 | A | −14.6 | −6 | A | A |
| 46 | 16 | 8.9 | 16 | 7.0 | A | −10.5 | −10 | A | A |
| 47 | 19 | 8.5 | 17 | 5.5 | A | −8.2 | −3.1 | A | B |
| 48 | 19 | 8.5 | 16 | 6.9 | A | −2.4 | 26.8 | A | A |
| 49 | 15 | 7.8 | 16 | 6.6 | A | 1.5 | 2.2 | A | A |
| 50 | 16 | 9.6 | 19 | 4.4 | B | 20.5 | −10 | A | B |
| 51 | 19 | 8.0 | 18 | 7.0 | A | 32.1 | −25.8 | A | A |
| 52 | 17 | 6.8 | 16 | 7.6 | A | 10 | 19.3 | A | A |
| 53 | 16 | 6.8 | 17 | 8.6 | A | −4.5 | 8.6 | A | A |
| 54 | 18 | 8.9 | 19 | 8.8 | A | −39.5 | 39.5 | A | A |
| 55 | 16 | 7.2 | 18 | 8.8 | A | −49.7 | 36.2 | A | A |
| 56 | 17 | 7.2 | 18 | 8.2 | A | −42.3 | 24.2 | A | A |
| 57 | 17 | 7.2 | 19 | 8.3 | A | −30 | 35.9 | A | A |
| 58 | 17 | 8.8 | 16 | 8.6 | A | −35.8 | 20.7 | A | A |
| 59 | 17 | 7.0 | 16 | 8.2 | A | −39.4 | 25.6 | A | A |
| 60 | 19 | 8 | 15 | 5.8 | B | 15 | 65 | B | B |

As is apparent from the results shown in Table 3, the number of "A" in the samples with the evaluation (total) was 16 and the yield was (16/20)×100=80%, which shows that the group III was improved significantly as compared with the group I and also improved as compared with the group II.

When the results were compared between Table 2 and Table 3, the number of "A" in the evaluation (GD) is the same both in the group II and the group III and the number is 16. Therefore, in the group III, like in the group II, the number where the difference in GD 2 between the left and right chips is in the range of 3 µm or less is large. The number of "A" in the evaluation (Bo) is increased from 13 in group II to 19 in group III.

Herein, in the group II, when the GD 1 is 25 µm, since the standard value of GD 2 is in the range from 6 to 9 µm, the grinding amount is set in the range from 16 to 19 µm. In this case, the grinding amount of the chip within the standard value becomes 19 µm or less. Thus, as GD 1 becomes smaller, the maximum value of the grinding amount becomes smaller. For instance, in the group II, when GD 1 is 20 µm, the maximum value of the grinding amount becomes 14 µm, and when GD 1 is 15 µm, the maximum value of the grinding amount is 9 µm.

Thus, as shown in each of the measurement results mentioned above, it is thought that the number where the difference between the right and left chips is within the range of 3 µm or less is larger by setting GD 1 to be small because the grinding amount is reduced.

In other words, it is thought that when the grinding amount is large, the variation in the grinding amount of both chips is enlarged. Therefore, if GD 1 is set in advance so that the grinding amount becomes small, it is possible to keep the difference in GD 2 between both chips within the specified amount of GD 2, before the difference in GD 2 between both chips becomes larger than the specified amount.

It is thought that the same is true in Bo as to the relationship with respect to the grinding amount. Before grinding, it is not possible to locate the top of the upper surface of the chip exactly because of cracks, etc. on the upper surface of the chip. Also, it is not possible to locate Bo exactly before grinding. Therefore, the value of Bo is not described in each Table, however, any samples are processed so that Bo before grinding is within the range of the standard value.

The reason why the processing is cared out by setting like this is that the change in the grinding amount of Bo is predicted to be small. Furthermore, the standard value of Bo is in the range from −50 to 50 μm and has some range of variation. When the location of the top of the upper surface of the chip is clarified by grinding, even if Bo is changed to some extent, it is predicted that the value of Bo is within the standard value with a high rate.

However, when the results of the group I to III shown in Tables 1 to 3 are compared, unlike the above-mentioned prediction, it is shown that the rate of Bo being within the standard value is higher as the group has smaller GD 1, that is, as the group has a smaller grinding amount. This shows that Bo changes in accordance with the grinding amount. Even if the initial Bo is within the standard value, if the grinding amount is too large, the complete chip is frequently out of the standard value. On the contrary, if the grinding amount is, for example, 19 μm or less like in the groups II to III, if the initial Bo is set so that it falls within the standard value, the rate of Bo of the complete chip being within the specified value becomes extremely high.

In the explanation of each Table, the yield of each group I to III was described. The following Table 4 shows the evaluation of the groups I to III that are carried out with this yield.

TABLE 4

| | range of GD 1 | GB*1 | Bo*2 | Total*3 | yield | judgement |
|---|---|---|---|---|---|---|
| G. I | 25 < GD 1 ≦ 35 μm | 11 | 10 | 5 | 25% | X |
| G. II | 20 ≦ GD 1 ≦ 25 μm | 16 | 17 | 13 | 65% | ○ |
| G. III | 15 ≦ GD 1 < 20 μm | 16 | 19 | 16 | 80% | ○ |

G. = Group
GB*1 = number of evaluation "A" with respect to GB
Bo*2 = number of evaluation "A" with respect to BO
Total*3 = number of evaluation "A" with respect to total The number shown in Table 4 refers to the number of "A" in each evaluation in Tables 1 to 3. As is apparent from Table 4, the yields of the group II and III are as excellent as 65% or more. The yield in Table 4 is determined only from the results of GD and Bo as mentioned above. In the actual manufacturing process, as defects due to fractures or cracks arise in a chip, the actual yield becomes lower than that shown in Table 4. However, most of defects are caused by defects of GD and Bo and the defects caused by fractures or cracks in a chip are not so significant. Therefore, also in the actual manufacturing process, it is assumed that the groups II and III can secure the yield of 55 to 60% or more.

As mentioned above, according to the present invention, since the high performance magnetic head with a smaller dimension of the gap depth can be manufactured efficiently, it is possible to enhance the productivity of a magnetic recording and reproducing apparatus such as VTR, etc. using such a high performance magnetic head and to reduce the manufacturing cost. Therefore, the present invention is useful as a magnetic recording and reproducing apparatus on which, for example, a high performance magnetic head with a transmission rate of 100 Mbit/s is mounted.

Moreover, in the above-mentioned embodiments, the example in which two chips are mounted on one head base is explained, however, since the present invention can exhibit the effect by setting GD 1 to 25 μm or less, it can be applied to a head base on which three or more of chips are mounted. Furthermore, the present invention is effective when one chip is mounted on one head base. As mentioned above, in order to obtain GD 2 within the range from 6 to 9 μm, even if GD 1 is larger than 25 μm, if the number of chips is one, when the grinding is stopped at the time the grinding is carried out until the standard value is obtained, the predetermined amount of GD 2 can be obtained.

However, in this case, Bo also has to be within the standard value. Since GD 2 and Bo cannot be adjusted separately, even if GD 2 can be within the standard value, Bo sometimes cannot be within the standard value. By setting GD 1 to 25 μm or less, since the defect of Bo can be reduced, even if one chip is mounted on one head base, the rate of both GD 2 and Bo being within the standard value can be improved.

Furthermore, in the above-mentioned embodiments, the example in which the standard value of GD 2 is in the range from 6 to 9 μm was explained. However, the standard value of GD 2 is not necessarily limited to this. The standard value of GD 2 may be determined in accordance with the performance of the magnetic head.

Furthermore, in the above-mentioned embodiment, the example of the ring-type head having a chip around which a coil is wound was explained. However, the same effect can be obtained in the case of the thin film type head.

Industrial Applicability

As mentioned above, according to the present invention, it is possible to manufacture efficiently a magnetic head satisfying both the dimension of the gap depth and the distance between the head gap and the top of the curved surface of the chip front, and to improve the productivity of the magnetic head having the improved magnetic head performance by reducing the dimension of the gap depth. Thus, the present invention is applicable to the method for manufacturing the magnetic head for magnetic recording and reproducing apparatus for a VTR etc. using the high performance magnetic head.

What is claimed is:

1. A method for manufacturing a magnetic head, the method comprising grinding a front of a head chip so as to form a front shape of the head chip, wherein a dimension of a gap depth of the head chip before grinding is 25 μm or less.

2. The method for manufacturing a magnetic head according to claim 1, wherein the dimension of the gap depth before grinding is 20 μm or less.

3. The method for manufacturing a magnetic head according to claim 2, wherein the dimension of the gap depth after grinding is to be 1 μm or more.

4. The method for manufacturing a magnetic head according to claim 1, wherein the dimension of the gap depth before grinding is 15 μm or less.

5. The method for manufacturing a magnetic head according to claim 4, wherein the dimension of the gap depth after grinding is to be 1 μm or more.

6. The method for manufacturing a magnetic head according to claim 1, wherein the difference between the dimension of the gap depth before grinding and the dimension of the gap depth after grinding is 19 μm or less.

7. The method for manufacturing a magnetic head according to claim 1, wherein the difference between the dimension of the gap depth before grinding and the dimension of the gap depth after grinding is 14 μm or less.

8. The method for manufacturing a magnetic head according to claim 1, wherein the difference between the dimension of the gap depth before grinding and the dimension of the gap depth after grinding is 9 μm or less.

9. The method for manufacturing a magnetic head according to claim 1, wherein a plurality of head chips are mounted on one magnetic head and the grinding is carried out with respect to the plurality of head chips simultaneously.

* * * * *